United States Patent
Zhang

(10) Patent No.: US 12,067,121 B2
(45) Date of Patent: Aug. 20, 2024

(54) TRUSTED BOOT METHOD AND APPARATUS, ELECTRONIC DEVICE, AND READABLE STORAGE MEDIUM

(71) Applicant: INSPUR SUZHOU INTELLIGENT TECHNOLOGY CO., LTD., Jiangsu (CN)

(72) Inventor: Zhaoyi Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 127 days.

(21) Appl. No.: 17/802,173

(22) PCT Filed: Jun. 28, 2020

(86) PCT No.: PCT/CN2020/098442
§ 371 (c)(1),
(2) Date: Aug. 25, 2022

(87) PCT Pub. No.: WO2021/169106
PCT Pub. Date: Sep. 2, 2021

(65) Prior Publication Data
US 2023/0359741 A1  Nov. 9, 2023

(30) Foreign Application Priority Data

Feb. 25, 2020 (CN) .......................... 202010116411.2

(51) Int. Cl.
G06F 21/57 (2013.01)
H04L 9/08 (2006.01)
H04L 9/32 (2006.01)

(52) U.S. Cl.
CPC ............ G06F 21/575 (2013.01); H04L 9/088 (2013.01); H04L 9/3247 (2013.01)

(58) Field of Classification Search
CPC ...... G06F 21/575; H04L 9/088; H04L 9/3247
See application file for complete search history.

(56) References Cited

U.S. PATENT DOCUMENTS 7,971,258 B1 * 6/2011 Liao ..................... G06F 21/564
713/164
10,635,820 B1 * 4/2020 Gallinghouse ........ H04L 9/3247
(Continued)

FOREIGN PATENT DOCUMENTS

| CN | 108134676 A | 6/2018 |
| CN | 109492370 A | 3/2019 |

(Continued)

OTHER PUBLICATIONS

International Search Report cited in PCT application PCT/CN2020/098442, mailed Dec. 1, 2020, 5 pages.
(Continued)

Primary Examiner — Aurel Prifti
(74) Attorney, Agent, or Firm — Cooper Legal Group LLC

(57) ABSTRACT

A trusted boot method and apparatus, an electronic device, and a readable memory medium. In the method, an IE FUSE that supports only one data write and an IE FW that supports multiple data writes are designed, whereby a first key written in the IE FUSE is prevented from being tampered with. If a second key generated based on a first signature extracted from the current IE FW is different from the first key, it indicates that IE boot parameters stored in the current IE FW are already different from those initially stored in the IE FW, that is, the parameters have been tampered with. In most cases, the IE boot parameters stored in the IE FW should not be tampered with. Therefore, once tampering is discovered, there are reasons to believe that there is a security risk of malicious attacks.

15 Claims, 5 Drawing Sheets

(56) References Cited

U.S. PATENT DOCUMENTS

| | | | |
|---|---|---|---|
| 11,210,079 B2* | 12/2021 | Fassino | G06F 21/64 |
| 11,520,891 B1* | 12/2022 | Karolitsky | H04L 9/3247 |
| 2006/0282654 A1* | 12/2006 | Veen | G06F 21/575 |
| | | | 713/1 |
| 2009/0070598 A1* | 3/2009 | Cromer | G06F 21/575 |
| | | | 713/193 |
| 2011/0246757 A1* | 10/2011 | Prakash | G06F 21/575 |
| | | | 713/168 |
| 2014/0068275 A1* | 3/2014 | Swanson | G06F 21/575 |
| | | | 713/192 |
| 2015/0261521 A1* | 9/2015 | Choi | H04L 9/3236 |
| | | | 713/176 |
| 2016/0098283 A1* | 4/2016 | Martinez | G06F 9/44505 |
| | | | 713/2 |
| 2016/0125187 A1* | 5/2016 | Oxford | H04L 63/0442 |
| | | | 713/2 |
| 2017/0187709 A1 | 6/2017 | Rotem et al. | |
| 2017/0364683 A1* | 12/2017 | Willden | G06F 12/14 |
| 2018/0032734 A1* | 2/2018 | Gunti | G06F 21/575 |
| 2018/0075242 A1* | 3/2018 | Khatri | H04L 9/3263 |
| 2019/0138730 A1* | 5/2019 | Liu | H04L 9/3247 |
| 2019/0147164 A1* | 5/2019 | Wing | G06F 21/57 |
| | | | 726/24 |
| 2019/0340365 A1* | 11/2019 | Nijhawan | G06F 21/44 |
| 2020/0042709 A1* | 2/2020 | Fu | G06F 9/4401 |
| 2020/0042710 A1* | 2/2020 | Liu | G06F 21/575 |
| 2020/0067715 A1* | 2/2020 | Yi | G06F 21/575 |
| 2021/0240833 A1* | 8/2021 | Bae | G06F 21/572 |
| 2022/0121749 A1* | 4/2022 | Liu | H04L 9/3239 |
| 2022/0207145 A1* | 6/2022 | Young | G06F 21/575 |

FOREIGN PATENT DOCUMENTS

| | | |
|---|---|---|
| CN | 109600392 A | 4/2019 |
| CN | 110730159 A | 1/2020 |
| KR | 101488747 B1 | 2/2015 |

OTHER PUBLICATIONS

Written Opinion of International Searching Authority of corresponding PCT application PCT/CN2020/098442, mailed Dec. 1, 2020, 8 pages.

* cited by examiner

TRUSTED BOOT METHOD AND APPARATUS, ELECTRONIC DEVICE, AND READABLE STORAGE MEDIUM

This application claims priority to Chinese Patent Application No. 202010116411.2, filed on Feb. 25, 2020, in China National Intellectual Property Administration and entitled "Trusted Boot Method and Apparatus, Electronic Device, and Readable Storage Medium", the contents of which are hereby incorporated by reference in its entirety.

FIELD

The present application relates to the technical field of secure boot of portable network devices, and particularly to a trusted boot method and apparatus, an electronic device, and a readable storage medium.

BACKGROUND

Innovation Engine (IE), an embedded core system of a Platform Controller Hub (PCH) (an integrated south bridge from Intel Corporation) or a System On Chip (SOC), is based on a tiny 32 bit kernel library. It is quite like a management system from Intel, but has its own privileges as well as differences in input/output interface. As a reduced Baseboard Management Controller (BMC) monitoring management system, the IE only has functions of a partial Intelligent Platform Management Interface (IPMI), Redfish (a management standard of Hyper Text Transfer Protocol Secure (HTTPS) service), Local Area Network (LAN) (network interface), etc.

With the advent of the 5th-Generation (5G) era, Internet of things communication is playing a leading role worldwide, and various medium and small-sized devices emerge continuously, such as network terminals, add-on switches and router devices, and remote monitoring systems. Compared with a server, these devices do not require high performance of x86-series Central Processing Units (CPUs), and only need to be supported by some low-power-consumption CPUs to enter Operating Systems (OSs) to load related modules for operation without any additional large-scale management system such as a BMC. Therefore, the IE, as a reduced monitoring management system, is the first choice for such devices. The IE only needs to perform simple monitoring and Sensor acquisition and control operations of related input and output pins to ensure the normal and stable operation of the system, and can implement the in-band upgrade of corresponding peripheral firmware versions.

On such devices, the IE is usually integrated into a flash with a Basic Input Output System (BIOS) practically responsible for booting the OS. Such a portable device has few requirements for monitoring management but extremely high requirements for the reliability, stability, security, and credibility of the OS, and requires the OS to be booted normally only after security verification is performed for each image file region during booting.

Currently, there is no implementation solution meeting requirements of such devices for security and credibility.

SUMMARY

The present application provides a trusted boot method and apparatus, an electronic device, and a readable storage medium, so as to provide a solution of implementing trusted boot through an IE for a portable device.

In order to achieve the above objective, the present application provides a trusted boot method, including:
  extracting a first key from an IE FUSE, wherein the IE FUSE supports only one-time data write, the first key is generated based on an initial IE boot parameter stored in IE Firmware (FW), and the IE FW supports multiple data writes;
  extracting a first signature from the IE FW, and generating a second key according to the first signature, wherein the second key is generated based on a current IE boot parameter stored in the IE FW;
  determining whether the first key is the same as the second key;
  in case the first key is the same as the second key, determining that the IE boot parameter stored in the IE FW is not tampered with, and controlling a Basic Input Output System (BIOS) through an Initial Boot Block (IBB) to boot an Operating System (OS);
  in case the first key is different from the second key, determining that the IE boot parameter stored in the IE FW is tampered with, and terminating the current boot.

Optionally, before the controlling a BIOS through an IBB to boot an OS, the method further includes:
  verifying whether a current BIOS boot parameter is trusted;
  in case the current BIOS boot parameter is untrusted, terminating the step of controlling a BIOS through an IBB to boot an OS;
  in case the current BIOS boot parameter is trusted, executing the step of controlling a BIOS through an IBB to boot an OS.

Optionally, the verifying whether a current BIOS boot parameter is trusted includes:
  extracting a third key from the IE FUSE, wherein the third key is generated based on an initial BIOS boot parameter stored in a BIOS boot parameter memory block, and the BIOS boot parameter memory block supports multiple data writes;
  extracting a second signature from the BIOS boot parameter memory block, and generating a fourth key according to the second signature, wherein the fourth key is generated based on the current BIOS boot parameter stored in the BIOS boot parameter memory block;
  determining whether the third key is the same as the fourth key;
  in case the third key is the same as the fourth key, determining that the current BIOS boot parameter is trusted;
  in case the third key is different from the fourth key, determining that the current BIOS boot parameter is untrusted.

Optionally, in case the BIOS boot parameter is stored in two memory blocks of Key Manifest (KM) and Boot Policy Manifest (BPM) separately, the verifying whether a current BIOS boot parameter is trusted includes:
  extracting a fifth key from the IE FUSE, wherein the fifth key is generated based on an initial BIOS boot parameter stored in the KM, and the KM supports multiple data writes;
  extracting a third signature from the KM, and generating a sixth key according to the third signature, wherein the sixth key is generated based on a current BIOS boot parameter stored in the KM;
  determining whether the fifth key is the same as the sixth key;
  in case the fifth key is the same as the sixth key, extracting a seventh key from the KM; extracting a fourth signature from the BPM, and generating an eighth key according to the fourth signature; determining whether the seventh key is the same as the eighth key; in case the seventh key is the same as the eighth key, determining that the current BIOS boot parameter is trusted, wherein the seventh key is generated based on an initial BIOS boot parameter stored in the BPM, the BPM supports multiple data writes, and the eighth key is generated based on a current BIOS boot parameter stored in the BPM;

in case the fifth key is different from the sixth key or the seventh key is different from the eighth key, determining that the current BIOS boot parameter is untrusted.

Optionally, before the terminating the current boot, the method further includes:

querying a preset special boot rule to determine whether there is any allow boot command corresponding to the current IE boot parameter;

if YES, controlling the BIOS through the IBB according to the current IE boot parameter to boot the OS, and simultaneously recording the current boot in a boot log as a special boot.

Optionally, the trusted boot method further includes:

obtaining a boot count of special boots within preset time statistically according to the boot log;

in case the boot count exceeds a preset count, giving a replacement prompt through a preset path, so as to replace a current chip device with a new chip device according to the replacement prompt, wherein a new first key generated based on the current IE boot parameter is stored in an IE FUSE of the new chip device.

In order to achieve the above objective, the present application also provides a trusted boot apparatus, including:

a first key acquisition unit, configured to extract a first key from an IE FUSE, wherein the IE FUSE supports only one-time data write, the first key is generated based on an initial IE boot parameter stored in IE Firmware (FW), and the IE FW supports multiple data writes;

a second key acquisition unit, configured to extract a first signature from the IE FW, and generate a second key according to the first signature, wherein the second key is generated based on a current IE boot parameter stored in the IE FW;

a first consistency determination unit, configured to determine whether the first key is the same as the second key;

a trusted boot unit, configured to, in case the first key is the same as the second key, determine that the IE boot parameter stored in the IE FW is not tampered with, and control a Basic Input Output System (BIOS) through an Initial Boot Block (IBB) to boot an Operating System (OS);

an untrusted boot termination unit, configured to, in case the first key is different from the second key, determine that the IE boot parameter stored in the IE FW is tampered with, and terminate the current boot.

Optionally, the trusted boot apparatus further includes:

a BIOS boot parameter credibility verification unit, configured to, before the BIOS is controlled through the IBB to boot the OS, verify whether a current BIOS boot parameter is trusted;

a boot operation termination unit, configured to, in case the current BIOS boot parameter is untrusted, terminate the step of controlling a BIOS through an IBB to boot an OS;

a boot operation execution unit, configured to, in case the current BIOS boot parameter is trusted, execute the step of controlling a BIOS through an IBB to boot an OS.

Optionally, the BIOS boot parameter credibility verification unit includes:

a third key acquisition subunit, configured to extract a third key from the IE FUSE, wherein the third key is generated based on an initial BIOS boot parameter stored in a BIOS boot parameter memory block, and the BIOS boot parameter memory block supports multiple data writes;

a fourth key acquisition subunit, configured to extract a second signature from the BIOS boot parameter memory block, and generating a fourth key according to the second signature, wherein the fourth key is generated based on the current BIOS boot parameter stored in the BIOS boot parameter memory block;

a second consistency determination subunit, configured to determine whether the third key is the same as the fourth key;

a first BIOS boot parameter trusted determination subunit, configured to, in case the third key is the same as the fourth key, determine that the current BIOS boot parameter is trusted;

a first BIOS boot parameter untrusted determination subunit, configured to, in case the third key is different from the fourth key, determine that the current BIOS boot parameter is untrusted.

Optionally, in case the BIOS boot parameter is stored in two memory blocks of KM and BPM separately, the BIOS boot parameter credibility verification unit includes:

a fifth key acquisition subunit, configured to extract a fifth key from the IE FUSE, wherein the fifth key is generated based on an initial BIOS boot parameter stored in the KM, and the KM supports multiple data writes;

a sixth key acquisition subunit, configured to extract a third signature from the KM, and generate a sixth key according to the third signature, wherein the sixth key is generated based on a current BIOS boot parameter stored in the KM;

a third consistency determination subunit, configured to determine whether the fifth key is the same as the sixth key;

a seventh key acquisition subunit, configured to, in case the fifth key is the same as the sixth key, extract a seventh key from the KM;

an eighth key acquisition subunit, configured to extract a fourth signature from the BPM, and generate an eighth key according to the fourth signature;

a fourth consistency determination subunit, configured to determine whether the seventh key is the same as the eighth key;

a second BIOS boot parameter trusted determination subunit, configured to, in case the seventh key is the same as the eighth key, determine that the current BIOS boot parameter is trusted, wherein the seventh key is generated based on an initial BIOS boot parameter stored in the BPM, the BPM supports multiple data writes, and the eighth key is generated based on a current BIOS boot parameter stored in the BPM;

a second BIOS boot parameter untrusted determination subunit, configured to, in case the fifth key is different from the sixth key or the seventh key is different from the eighth key, determine that the current BIOS boot parameter is untrusted.

Optionally, the trusted boot apparatus further includes:
a special allow boot confirmation unit, configured to, before the current boot is terminated, query a preset special boot rule to determine whether there is any allow boot command corresponding to the current IE boot parameter;
a special boot and recording unit, configured to, in case there is an allow boot command corresponding to the current IE boot parameter in the special boot rule, control the BIOS through the IBB according to the current IE boot parameter to boot the OS, and simultaneously record the current boot in a boot log as a special boot.

Optionally, the trusted boot apparatus further includes:
a special boot count statistics unit, configured to obtain a boot count of special boots within preset time statistically according to the boot log;
a replacement prompt giving unit, configured to, in case the boot count exceeds a preset count, give a replacement prompt through a preset path, so as to replace a current chip device with a new chip device according to the replacement prompt, wherein a new first key generated based on the current IE boot parameter is stored in an IE FUSE of the new chip device.

In order to achieve the above objective, the present application also provides an electronic device, including:
a memory, configured to store a computer program;
a processor, configured to execute the computer program to implement each step of the trusted boot method as described in the above contents.

In order to achieve the above objective, the present application also provides a readable storage medium, storing a computer program, which when executed by a processor implements each step of the trusted boot method as described in the above contents.

The trusted boot method provided in the present application includes: extracting a first key from an IE FUSE, wherein the IE FUSE supports only one-time data write, the first key is generated based on an initial IE boot parameter stored in IE Firmware (FW), and the IE FW supports multiple data writes; extracting a first signature from the IE FW, and generating a second key according to the first signature, wherein the second key is generated based on a current IE boot parameter stored in the IE FW; determining whether the first key is the same as the second key; in case the first key is the same as the second key, determining that the IE boot parameter stored in the IE FW is not tampered with, and controlling a Basic Input Output System (BIOS) through an Initial Boot Block (IBB) to boot an Operating System (OS); in case the first key is different from the second key, determining that the IE boot parameter stored in the IE FW is tampered with, and terminating the current boot.

It can be seen according to the trusted boot method provided in the present application that an IE FUSE that supports only one-time data write and an IE FW that supports multiple data writes are designed, whereby a first key written in the IE FUSE is prevented from being tampered with. Once a second key generated based on a first signature extracted from the current IE FW is different from the first key, it indicates that IE boot parameter stored in the current IE FW is already different from that initially stored in the IE FW, that is, the parameters have been tampered with. In most cases, the IE boot parameters stored in the IE FW should not be tampered with. Therefore, once tampering is discovered, there are reasons to believe that there is a security risk of malicious attacks. With application of the trusted boot method provided in the present application, whether an IE boot parameter is trusted may be determined effectively and accurately according to whether keys are consistent, thereby ensuring secure and trusted boot of a portable device. The present application also provides a trusted boot apparatus, an electronic device, and a readable storage medium, all of which have the foregoing beneficial effects. Elaborations are omitted herein.

BRIEF DESCRIPTION OF THE DRAWINGS

In order to describe the embodiments of the present invention or the technical solutions in the existing art more clearly, drawings required to be used in the embodiments or the illustration of the existing art will be briefly introduced below. Apparently, the drawings in the illustration below are only some embodiments of the present application. Those ordinarily skilled in the art also can obtain other drawings according to the provided drawings without creative work.

DETAILED DESCRIPTION

The present application provides a trusted boot method and apparatus, an electronic device, and a readable storage medium, so as to provide a solution of implementing trusted boot through an IE for a portable device.

In order to make the objective, technical solutions, and advantages of the embodiments of the present application clearer, the technical solutions in the embodiments of the present application will be described clearly and completely below in combination with the drawings in the embodiments of the present application. Based on the embodiments of the present application, all other embodiments obtained by those skilled in the art without creative work shall fall within the protection scope of the present application.

Embodiment 1

Figure 1:
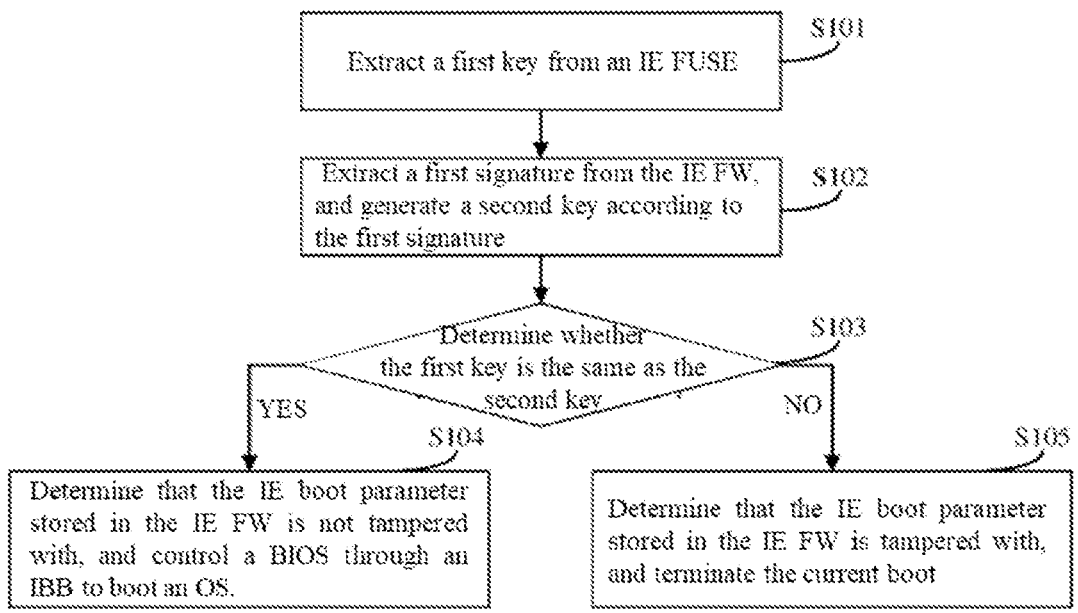
FIG. 1 is a flowchart of a trusted boot method according to embodiments of the present application.

Referring to FIG. 1, which is a flowchart of a trusted boot method according to an embodiment of the present application. The method includes the following steps.

S101: extract a first key from an IE FUSE.

The IE FUSE supports only one-time write. The first key is generated based on an initial IE boot parameter stored in IE FW. The IE FW supports multiple data writes. The IE FUSE and the IE FW are different data memory blocks on the same flash respectively.

Since the IE FUSE supports only one-time data write, the first key is unchangeable after being written in the IE FUSE. In the present application, consistency comparison with the second key in the IE FW practically storing the IE boot parameter is performed by virtue of this characteristic, thereby determining whether data stored in the IE FW is tampered with.

S102: extract a first signature from an IE FW, and generate a second key according to the first signature.

The second key is generated based on a current IE boot parameter stored in the IE FW. The first signature is a product obtained by encapsulating the second key by specific means.

When the first key is specifically a public key calculated based on the IE boot parameter with an asymmetric encryption algorithm, the first signature is a product obtained by encrypting the public key with a private key corresponding to the public key. When the first key is specifically a hash value (or referred to as a digest) obtained by performing a hash operation on the public key, the first signature is correspondingly a product obtained by encrypting the digest with the private key.

S103: determine whether the first key is the same as the second key. If YES, S104 is executed, otherwise S105 is executed.

Based on S101 and S102, this step aims to determine whether the first key is the same as the second key, so as to determine according to a determination result whether the IE boot parameter stored in the IE FW that supports multiple data writes is tampered with to further determine whether the current IE boot parameter is trusted.

S104: determine that the IE boot parameter stored in the IE FW is not tampered with, and control a BIOS through an IBB to boot an OS.

This step is based on a determination result of S103 that the first key is the same as the second key. In such case, it indicates that the current IE boot parameter stored in the IE FW remains the same as the IE boot parameter initially written in the IE FW, and thus it may be determined that the IE boot parameter stored in the IE FW is not tampered with. In case the IE boot parameter is not tampered with, it is considered that the current IE boot parameter is trusted. Therefore, an IBB (including a Security file (SEC file), a Pre Extensible Firmware Interface (EFI) Initialization (PEI) core, and PEI modules (driver execution environment)) transfers control power to a BIOS, and then the BIOS boots an OS in four stages through a Unified EFI (UEFI).

In S105: determine that the IE boot parameter stored in the IE FW is tampered with, and terminate the current boot.

This step is based on a determination result in S103 that the first key is different from the second key. In such a case, it indicates that the current IE boot parameter stored in the IE FW is no more the IE boot parameter initially written in the IE FW, and thus it can be determined that the IE boot parameter stored in the IE FW is tampered with. Tampering by an official or an officially authorized administrator is usually notified ahead. Therefore, in case the IE boot parameter is tampered with, there are reasons to believe that the current IE boot parameter is untrusted, and the current boot is terminated.

Taking a smart web camera as an example, if such a portable network device uses an IE-based processor as a CPU, and an IE boot parameter thereof is tampered with maliciously, it is very likely that the device is remotely controlled and user privacies are pried under control. Therefore, to solve such problems, it is found by the determination in the above solution that the current IE boot parameter is untrusted, and the current boot is terminated.

It can be seen according to the trusted boot method provided in the present application that an IE FUSE that supports only one-time data write and an IE FW that supports multiple data writes are designed, whereby a first key written in the IE FUSE is prevented from being tampered with. Once a second key generated based on a first signature extracted from the current IE FW is different from the first key, it indicates that IE boot parameter stored in the current IE FW is already different from that initially stored in the IE FW, that is, the parameters have been tampered with. In most cases, the IE boot parameters stored in the IE FW should not be tampered with. Therefore, once tampering is discovered, there are reasons to believe that there is a security risk of malicious attacks. With application of the trusted boot method provided in the present application, whether an IE boot parameter is trusted may be determined effectively and accurately according to whether keys are consistent, thereby ensuring secure and trusted boot of a portable device.

Figure 2:
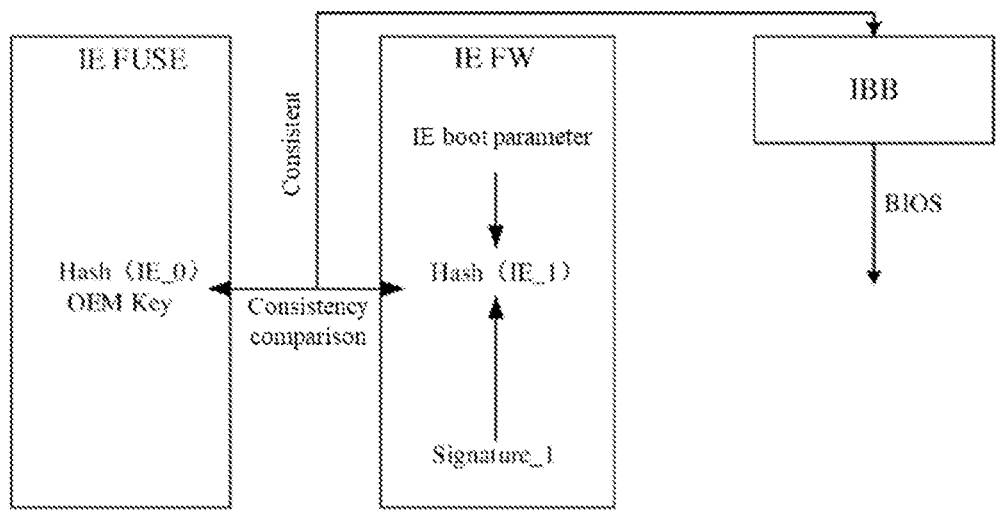
FIG. 2 is a schematic flowchart of trusted boot corresponding to the method shown in FIG. 1.

In a specific application scenario shown in FIG. 2, the first key may be named Original Equipment Manufacturer (OEM) key, and corresponding hash (IE_0) represents a hash operation result of a public key calculated based on the IE boot parameter initially written in the IE FW. Hash (IE_0) may be compared whether to be the same as hash (IE_1) to determine whether the IE boot parameter stored in the IE FW is tampered with. If they are the same, the IBB controls the BIOS to boot the OS.

Embodiment 2

The above-mentioned embodiment provides a solution for verifying whether the current IE boot parameter is trusted. It can be seen according to the descriptions about an application mode of an IE in BACKGROUND of the present application that: the IE, as a reduced BMC, is integrated into a flash with the BIOS. Based on the characteristic of the IE, in a whole boot process of a device, the IE is booted prior to the BIOS, and transfers control to the BIOS after being booted, and then the BIOS controls the boot of the OS.

Therefore, although the possibility that a BIOS boot parameter is tampered with is not so high in case the IE boot parameter is trusted, considering that there are really such possibilities and precedents, in the present embodiment, credibility verification of the BIOS boot parameter is further performed based on embodiment 1 to maximally ensure the security and reliability of the current boot.

Figure 3:
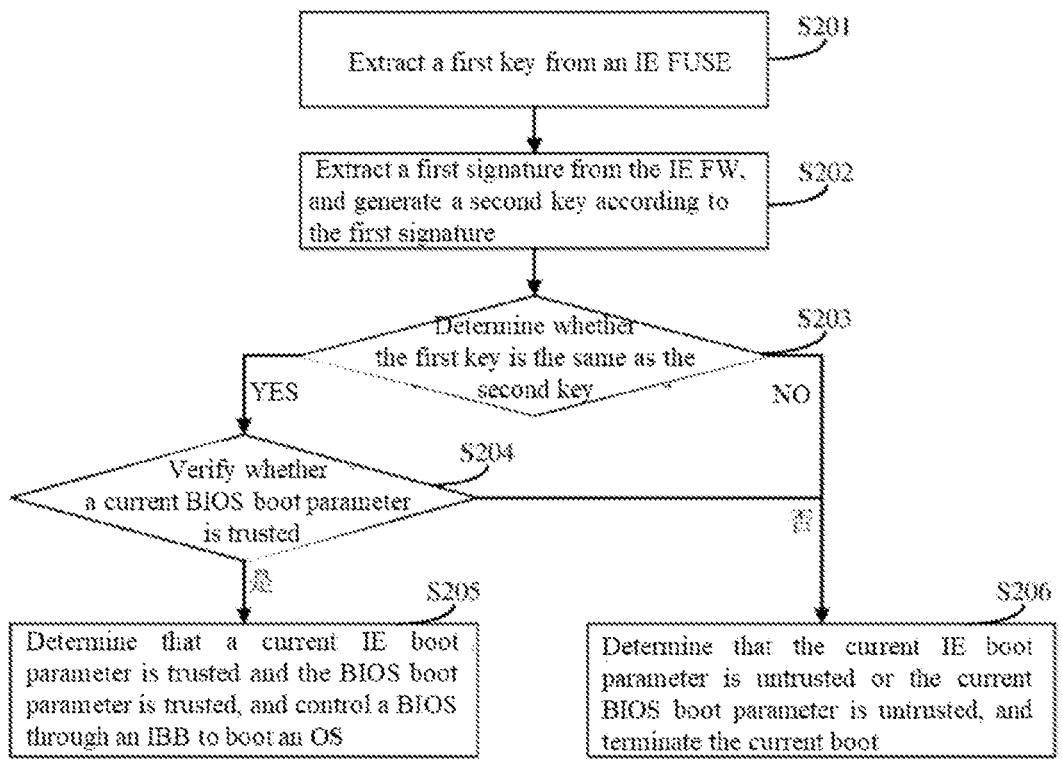
FIG. 3 is a flowchart of another trusted boot method according to embodiments of the present application.

Referring to FIG. 3, which is a flowchart of another trusted boot method according to an embodiment of the present application. The method includes the following steps.

S201: extract a first key from an IE FUSE;

S202: extract a first signature from an IE FW, and generate a second key according to the first signature;

S203: determine whether the first key is the same as the second key. If YES, S204 is executed, otherwise S206 is executed;

S204: verify whether a current BIOS boot parameter is trusted. If YES, S205 is executed, otherwise S206 is executed.

Compared with embodiment 1, in the present embodiment, the operation of verifying whether a current BIOS boot parameter is trusted is further executed in case of determining that the first key is the same as the second key, thereby ensuring that the BIOS boot parameter is also trusted in case the IE boot parameter is trusted.

Specifically, the current BIOS boot parameter may be verified by the method for verifying the current IE boot parameter is trusted in the present application. That is, some other keys are stored in, for example, the IE FUSE that supports only one-time data write, and are subjected to consistency comparison with a practical key representing the current BIOS boot parameter. There are diversified specific implementation modes, and specific references may be made to two different specific implementation solutions provided in embodiment 3 of the present application.

S205: determine that a current IE boot parameter is trusted and the BIOS boot parameter is trusted, and control a BIOS through an IBB to boot an OS.

S206: determine that the current IE boot parameter is untrusted or the current BIOS boot parameter is untrusted, and terminate the current boot.

Embodiment 3

The present embodiment provides two different implementation modes of verifying whether the current BIOS boot parameter is trusted through the flowchart shown in FIG. 4 and the flowchart shown in FIG. 5 respectively, which are distinguished by how the BIOS boot parameter is stored in the flash, and will be introduced below respectively.

Figure 4:
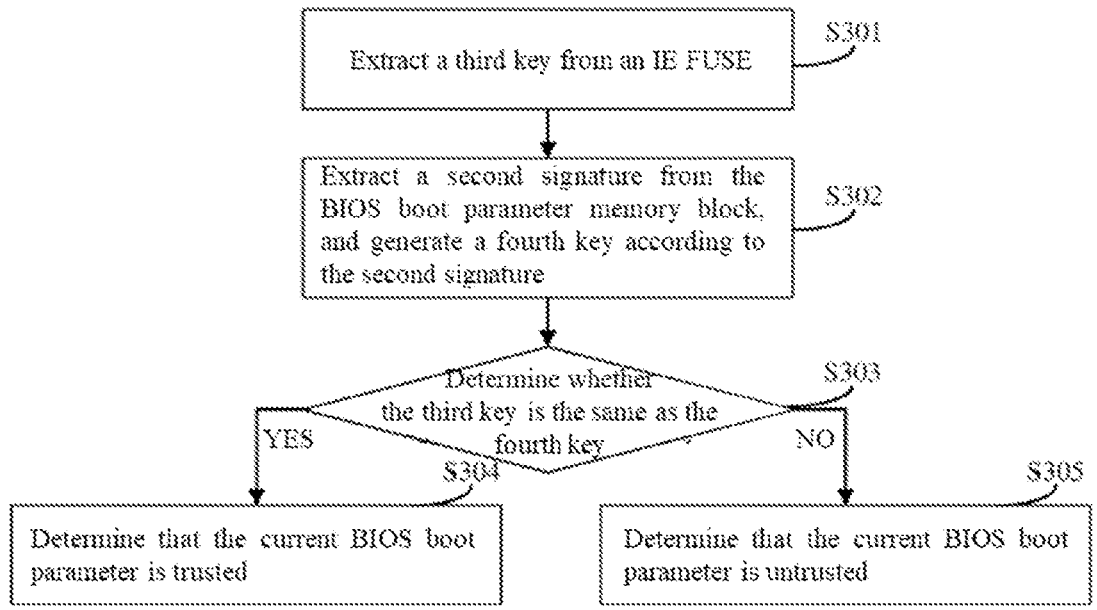
FIG. 4 is a flowchart of a method for verifying whether a current BIOS boot parameter is trusted in a trusted boot method according to an embodiment of the present application.

Referring to FIG. 4, which is a flowchart of a method for verifying whether a current BIOS boot parameter is trusted in a trusted boot method according to an embodiment of the present application. The method includes the following steps.

S301: extract a third key from an IE FUSE.

Wherein the third key is generated based on an initial BIOS boot parameter stored in a BIOS boot parameter memory block, and the BIOS boot parameter memory block supports multiple data writes.

S302: extract a second signature from the BIOS boot parameter memory block, and generate a fourth key according to the second signature.

The fourth key is generated based on the current BIOS boot parameter stored in the BIOS boot parameter memory block.

The third key, the second signature, and the fourth key can be obtained by all possible generation methods similar to the first key, the first signature, and the second key. The difference is the boot parameter that they are based on. The first key, the first signature, and the second key are based on the IE boot parameter, while the third key, the second signature, and the fourth key are based on the BIOS boot parameter. Storage positions are slightly different. Elaborations are omitted herein.

S303: determine whether the third key is the same as the fourth key. If YES, S304 is executed, otherwise S305 is executed.

S304: determine that the current BIOS boot parameter is trusted.

S305: determine that the current BIOS boot parameter is untrusted.

It can be seen according to each step shown in FIG. 4 that, according to the above solution, the BIOS boot parameter is completely stored in a single BIOS boot parameter memory block, the initial version is also pre-written in the IE FUSE that supports only one-time data write, and whether the current BIOS boot parameter is trusted is verified in a similar mode in case the current IE boot parameter is verified to be trusted.

Figure 5:
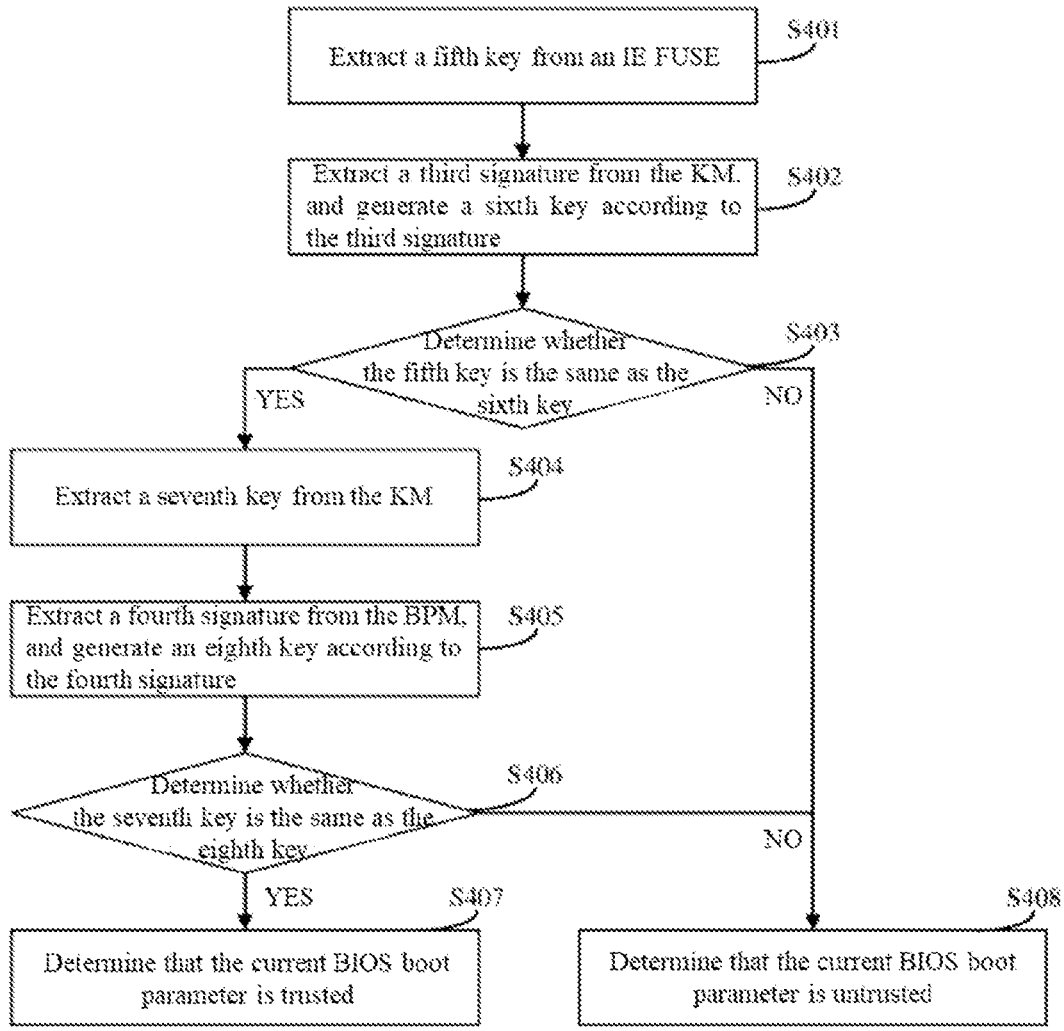
FIG. 5 is a flowchart of another method for verifying whether a current BIOS boot parameter is trusted in a trusted boot method according to an embodiment of the present application.

Unlike the solution shown in FIG. 4, the other solution shown in FIG. 5 takes a special requirement for the BIOS boot parameter in a certain practical scenario as a restriction. The whole BIOS boot parameter is divided into two parts for storage in a KM memory block and BPM in the flash respectively. A corresponding implementation mode is provided, including the following steps.

S401: extract a fifth key from an IE FUSE.

The fifth key is generated based on an initial BIOS boot parameter stored in the KM. The KM supports multiple data writes.

S402: extract a third signature from the KM, and generate a sixth key according to the third signature.

The sixth key is generated based on a current BIOS boot parameter stored in the KM.

S403: determine whether the fifth key is the same as the sixth key. If YES, S404 is executed, otherwise S408 is executed.

S404: extract a seventh key from the KM.

The seventh key is generated based on an initial BIOS boot parameter stored in the BPM. The BPM supports multiple data writes.

S405: extract a fourth signature from the BPM, and generate an eighth key according to the fourth signature.

The eighth key is generated based on a current BIOS boot parameter stored in the BPM.

S406: determine whether the seventh key is the same as the eighth key. If YES, S407 is executed, otherwise S408 is executed.

S407: determine that the current BIOS boot parameter is trusted.

S408: determine that the current BIOS boot parameter is untrusted.

Unlike the solution shown in FIG. 4, the BIOS boot parameter is partially stored in the KM and the BPM respectively. To achieve similar verification effects, key-consistency-based verification is sequentially performed here, and only when the two parts of the BIOS boot parameter pass consistency verification and are determined not to be tampered with, it is determined that the current BIOS boot parameter is trusted.

Compared with using a single BIOS boot parameter memory block, the solution of splitting into two different memory blocks has the advantage that difficulties in tampering may further be improved, and the security and the reliability are further improved.

Figure 6:
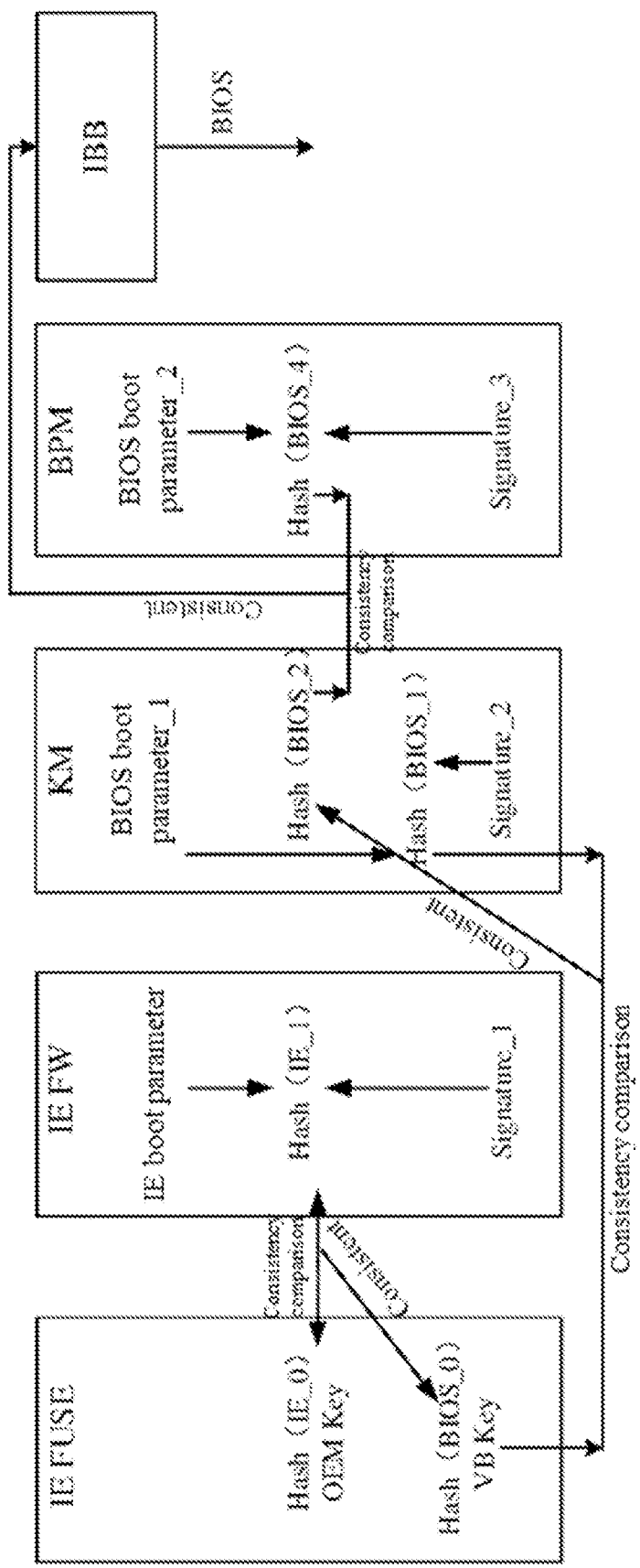
FIG. 6 is a schematic flowchart of another trusted boot corresponding to the method shown in FIG. 5.

For ease of understanding, the present application also provides a schematic boot flowchart corresponding to the implementation solution shown in FIG. 5 through FIG. 6. An overall principle is like FIG. 2, and cross-references may be made. The difference from FIG. 2 is how to implement the credibility verification of the BIOS boot parameter through the added KM and BPM. The part of BIOS boot parameter stored in the KM is represented as BIOS boot parameter_1, and the part of BIOS boot parameter stored in the BPM is represented as BIOS boot parameter_2. Digital signatures and keys are correspondingly different.

Based on any one of the above-mentioned embodiments, sometimes there are really modifications made officially or under an official authorization to the IE boot parameter and/or the BIOS boot parameter. This usually happens when the processor has a great undiscovered defect before delivery or a temporary change is needed. However, the device is finally booted under the control of the latest IE boot parameter and/or BIOS boot parameter.

Figure 7:
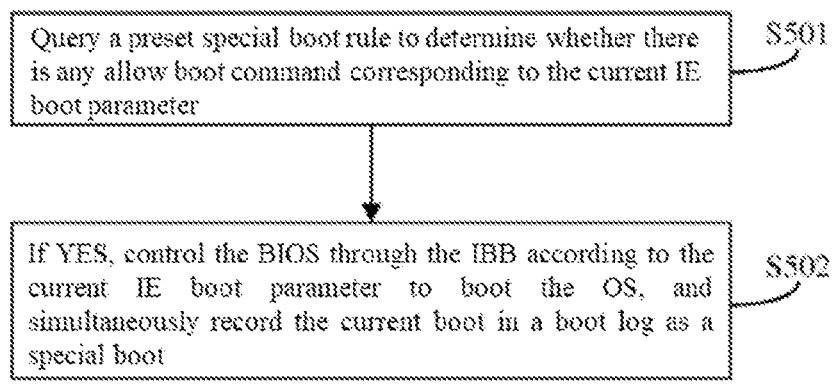
FIG. 7 is a flowchart of a method for determining whether special boot is allowed based on a special boot rule according to an embodiment of the present application.

In order to prevent the condition that the device cannot be used normally when the boot is determined to be terminated in the above solution, in the present application, the device is helped to be booted normally through a preset special boot rule as temporary means. Referring to the flowchart shown in FIG. 7 taking the IE boot parameter as an example, the following steps are included.

S501: query a preset special boot rule to determine whether there is any allow boot command corresponding to the current IE boot parameter.

Correspondence between an IE boot parameter and an allow boot command may be established in various manners, such as binding, key-value pair, and list.

S502: if YES, control the BIOS through the IBB according to the current IE boot parameter to boot the OS, and simultaneously record the current boot in a boot log as a special boot.

This step is executed in case there is an allow boot command corresponding to the current IE boot parameter. In such a case, although the current IE boot parameter is tampered with, the existence of the allow boot command indicates that tampering is performed officially or under an official authorization, and security and reliability are guaranteed. Therefore, the BIOS is controlled through the IBB according to the current IE boot parameter to boot the OS, and the current boot is simultaneously recorded in a boot log as a special boot for later tracing.

Further, a boot count of special boots within preset time may be obtained statistically according to the boot log, and in case the boot count exceeds a preset count, a replacement prompt is given through a preset path, so as to replace a current chip device with a new chip device according to the replacement prompt, wherein a new first key generated based on the current IE boot parameter is stored in an IE FUSE of the new chip device.

If the count of special boots within the preset time exceeds the preset count, it indicates that the latest IE boot parameter after tampering is verified to be available. In order to prevent bug increases caused by the special boot rule-based temporary means, it is also necessary to replace the device with a new chip device timely to ensure normal boot in a normal determination process. Since a portable network device is not so high in arithmetic capability, the special boot rule-based temporary means inevitably affects user experiences during use.

Based on the credibility verification solutions for the IE boot parameter and the BIOS boot parameter in the above contents, in combination with various other types of data or parameters practically existing in the boot process of the processor, those skilled in the art may also perform credibility verification on these data or parameters based on this concept. Elaborations are omitted herein.

The complex situation makes it impossible to enumerate the data or parameters for description one by one. Those skilled in the art should realize that there may be many examples according to the basic method and principle provided in the present application in combination with actual situations, and all of them shall fall within the scope of protection of the present application without adequate creative work.

Figure 8:
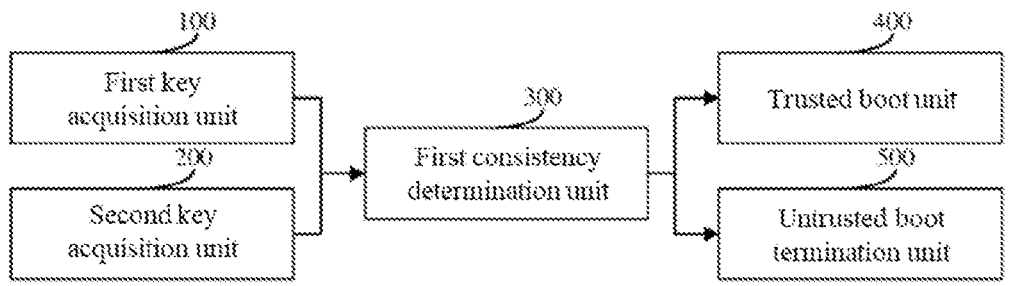
FIG. 8 is a structural block diagram of a trusted boot apparatus according to an embodiment of the present application.

Referring to FIG. 8, which is a structural block diagram of a trusted boot apparatus according to an embodiment of the present application. The apparatus may include:
  a first key acquisition unit 100, configured to extract a first key from an IE FUSE, wherein the IE FUSE supports only one-time data write, the first key is generated based on an initial IE boot parameter stored in IE Firmware (FW), and the IE FW supports multiple data writes;
  a second key acquisition unit 200, configured to extract a first signature from the IE FW, and generate a second key according to the first signature, wherein the second key is generated based on a current IE boot parameter stored in the IE FW;
  a first consistency determination unit 300, configured to determine whether the first key is the same as the second key;
  a trusted boot unit 400, configured to, in case the first key is the same as the second key, determine that the IE boot parameter stored in the IE FW is not tampered with, and control a Basic Input Output System (BIOS) through an Initial Boot Block (IBB) to boot an Operating System (OS);
  an untrusted boot termination unit 500, configured to, in case the first key is different from the second key, determine that the IE boot parameter stored in the IE FW is tampered with, and terminate the current boot.

Further, the trusted boot apparatus may further include:
  a BIOS boot parameter credibility verification unit, configured to, before the BIOS is controlled through the IBB to boot the OS, verify whether a current BIOS boot parameter is trusted;
  a boot operation termination unit, configured to, in case the current BIOS boot parameter is untrusted, terminate the step of controlling a BIOS through an IBB to boot an OS;
  a boot operation execution unit, configured to, in case the current BIOS boot parameter is trusted, execute the step of controlling a BIOS through an IBB to boot an OS.

The BIOS boot parameter credibility verification unit may include:
  a third key acquisition subunit, configured to extract a third key from the IE FUSE, wherein the third key is generated based on an initial BIOS boot parameter stored in a BIOS boot parameter memory block, and the BIOS boot parameter memory block supports multiple data writes;
  a fourth key acquisition subunit, configured to extract a second signature from the BIOS boot parameter memory block, and generate a fourth key according to the second signature, wherein the fourth key is generated based on the current BIOS boot parameter stored in the BIOS boot parameter memory block;
  a second consistency determination subunit, configured to determine whether the third key is the same as the fourth key;
  a first BIOS boot parameter trusted determination subunit, configured to, in case the third key is the same as the fourth key, determine that the current BIOS boot parameter is trusted;
  a first BIOS boot parameter untrusted determination subunit, configured to, in case the third key is different from the fourth key, determine that the current BIOS boot parameter is untrusted.

In case the BIOS boot parameter is stored in two memory blocks of KM and BPM separately, the BIOS boot parameter credibility verification unit may include:
  a fifth key acquisition subunit, configured to extract a fifth key from the IE FUSE, wherein the fifth key is generated based on an initial BIOS boot parameter stored in the KM, and the KM supports multiple data writes;

a sixth key acquisition subunit, configured to extract a third signature from the KM, and generate a sixth key according to the third signature, wherein the sixth key is generated based on a current BIOS boot parameter stored in the KM;

a third consistency determination subunit, configured to determine whether the fifth key is the same as the sixth key;

a seventh key acquisition subunit, configured to, in case the fifth key is the same as the sixth key, extract a seventh key from the KM;

an eighth key acquisition subunit, configured to extract a fourth signature from the BPM, and generate an eighth key according to the fourth signature;

a fourth consistency determination subunit, configured to determine whether the seventh key is the same as the eighth key;

a second BIOS boot parameter trusted determination subunit, configured to, in case the seventh key is the same as the eighth key, determine that the current BIOS boot parameter is trusted, wherein the seventh key is generated based on an initial BIOS boot parameter stored in the BPM, the BPM supports multiple data writes, and the eighth key is generated based on a current BIOS boot parameter stored in the BPM;

a second BIOS boot parameter untrusted determination subunit, configured to, in case the fifth key is different from the sixth key or the seventh key is different from the eighth key, determine that the current BIOS boot parameter is untrusted.

Further, the trusted boot apparatus may further include:

a special allow boot confirmation unit, configured to, before the current boot is terminated, query a preset special boot rule to determine whether there is any allow boot command corresponding to the current IE boot parameter;

a special boot and recording unit, configured to, in case there is an allow boot command corresponding to the current IE boot parameter in the special boot rule, control the BIOS through the IBB according to the current IE boot parameter to boot the OS, and simultaneously record the current boot in a boot log as a special boot.

Furthermore, the trusted boot apparatus may further include:

a special boot count statistics unit, configured to obtain a boot count of special boots within preset time statistically according to the boot log;

a replacement prompt giving unit, configured to, in case the boot count exceeds a preset count, give a replacement prompt through a preset path, so as to replace a current chip device with a new chip device according to the replacement prompt, wherein a new first key generated based on the current IE boot parameter is stored in an IE FUSE of the new chip device.

Based on the above-mentioned embodiments, the present application also provides an electronic device, which may include a memory and a processor. The memory stores a computer program. The processor, when calling the computer program in the memory, can implement the steps provided in the above-mentioned embodiment. Certainly, the electronic device may further include various desired network interfaces, a power supply, other components and parts, etc.

The present application also provides a readable storage medium, storing a computer program that may be executed by a terminal or a processor to implement the steps provided in the above-mentioned embodiment. The storage medium may include various media capable of storing program codes, such as a U disk, a mobile hard disk, a Read-Only Memory (ROM), a Random Access Memory (RAM), a magnetic disk, or an optical disk.

All the embodiments in this specification are described progressively. Contents mainly described in each embodiment are different from those described in other embodiments. Same or similar parts of all the embodiments refer to each other. For the apparatus disclosed in the embodiments, since it corresponds to the method disclosed in the embodiments, the description is relatively simple, and the relevant part can be referred to the description of the method part.

The skilled person may further realize that the units and algorithmic steps of each example described in conjunction with the embodiments disclosed herein are capable of being implemented in electronic hardware, computer software, or a combination of both, and that the composition and steps of each example have been described generally by function in the above description to clearly illustrate the interchangeability of hardware and software. Whether these functions are performed in hardware or software depends on the particular application and design constraints of the technical solution. The skilled person may use different methods to implement the described functions for each particular application, but such implementation should not be considered as going beyond the scope of the present application.

Specific examples are applied in this specification to illustrate the principle and embodiments of the present application, and the above description of the embodiments is only used to help understand the method of the present application and the core idea thereof. For a person of ordinary skill in the art, several improvements and modifications can be made to the present application without departing from the principle of the present application, and these improvements and modifications also fall within the scope of protection of the claims of the present application.

It is also noted that in this specification, relationship terms such as first and second are used only to distinguish one entity or operation from another entity or operation, without necessarily requiring or implying any such actual relationship or order between those entities or operations. Further, the terms "include" "comprise" or any other variation thereof are intended to cover non-exclusive inclusion, so that a process, method, article, or apparatus that includes a set of elements includes not only those elements, but also other elements not expressly listed, or also include elements that are inherent to such process, method, article, or apparatus. Without further limitation, the elements defined by the statement "comprising a . . . " do not preclude the existence of additional identical elements in the process, method, article, or apparatus that include said elements.

The invention claimed is:

1. A trusted boot method, comprising:
extracting a first key from an innovation engine (IE) (Filesystem in Userspace) FUSE, wherein the IE FUSE supports only one-time data write, the first key is generated based on an initial IE boot parameter stored in IE Firmware (FW), and the IE FW supports multiple data writes;
extracting a first signature from the IE FW, and generating a second key according to the first signature, wherein the second key is generated based on a current IE boot parameter stored in the IE FW;
determining whether the first key is the same as the second key;

in response to determining that the first key is the same as the second key, determining that the initial IE boot parameter stored in the IE FW is not tampered with, and controlling a Basic Input Output System (BIOS) through an Initial Boot Block (IBB) to boot an Operating System (OS); and in response to determining that the first key is different from the second key, determining that the initial IE boot parameter stored in the IE FW is tampered with, and terminating a current boot;

wherein before the terminating a current boot, the method further comprises:

querying a preset special boot rule to determine whether there is any allow boot command corresponding to the current IE boot parameter; and in response to determining that there is an allow boot command corresponding to the current IE boot parameter, controlling the BIOS through the IBB according to the current IE boot parameter to boot the OS, and simultaneously recording the current boot in a boot log as a special boot.

2. The trusted boot method according to claim 1, wherein before the controlling a BIOS through an IBB to boot an OS, the method further comprises:

verifying whether a current BIOS boot parameter is trusted;

in response to determining that the current BIOS boot parameter is untrusted, terminating the step of controlling a BIOS through an IBB to boot an OS; and in response to determining that the current BIOS boot parameter is trusted, executing the step of controlling a BIOS through an IBB to boot an OS.

3. The trusted boot method according to claim 2, wherein the verifying whether a current BIOS boot parameter is trusted comprises:

extracting a third key from the IE FUSE, wherein the third key is generated based on an initial BIOS boot parameter stored in a BIOS boot parameter memory block, and the BIOS boot parameter memory block supports multiple data writes;

extracting a second signature from the BIOS boot parameter memory block, and generating a fourth key according to the second signature, wherein the fourth key is generated based on the current BIOS boot parameter stored in the BIOS boot parameter memory block;

determining whether the third key is the same as the fourth key;

in response to determining that the third key is the same as the fourth key, determining that the current BIOS boot parameter is trusted; and in response to determining that the third key is different from the fourth key, determining that the current BIOS boot parameter is untrusted.

4. The trusted boot method according to claim 2, wherein when the current BIOS boot parameter is stored in two memory blocks of Key Manifest (KM) and Boot Policy Manifest (BPM) separately, the verifying whether a current BIOS boot parameter is trusted comprises:

extracting a fifth key from the IE FUSE, wherein the fifth key is generated based on an initial BIOS boot parameter stored in the KM, and the KM supports multiple data writes;

extracting a third signature from the KM, and generating a sixth key according to the third signature, wherein the sixth key is generated based on the current BIOS boot parameter stored in the KM;

determining whether the fifth key is the same as the sixth key;

in response to determining that the fifth key is the same as the sixth key, extracting a seventh key from the KM; extracting a fourth signature from the BPM, and generating an eighth key according to the fourth signature; determining whether the seventh key is the same as the eighth key; in response to determining that the seventh key is the same as the eighth key, determining that the current BIOS boot parameter is trusted, wherein the seventh key is generated based on an initial BIOS boot parameter stored in the BPM, the BPM supports multiple data writes, and the eighth key is generated based on the current BIOS boot parameter stored in the BPM; and in response to determining that the fifth key is different from the sixth key or the seventh key is different from the eighth key, determining that the current BIOS boot parameter is untrusted.

5. The trusted boot method according to claim 1, further comprising:

obtaining a boot count of special boots within preset time statistically according to the boot log; and in response to the boot count exceeding a preset count, giving a replacement prompt through a preset path, so as to replace a current chip device with a new chip device according to the replacement prompt, wherein a new first key generated based on the current IE boot parameter is stored in an IE FUSE of the new chip device.

6. An electronic device, comprising:

a memory, configured to store a computer program;

a processor, configured to execute the computer program to implement a trusted boot method;

wherein the trusted boot method comprises:

extracting a first key from an innovation engine (IE) (Filesystem in Userspace) FUSE, wherein the IE FUSE supports only one-time data write, the first key is generated based on an initial IE boot parameter stored in IE Firmware (FW), and the IE FW supports multiple data writes;

extracting a first signature from the IE FW, and generating a second key according to the first signature, wherein the second key is generated based on a current IE boot parameter stored in the IE FW;

determining whether the first key is the same as the second key;

in response to determining that the first key is the same as the second key, determining that the initial IE boot parameter stored in the IE FW is not tampered with, and controlling a Basic Input Output System (BIOS) through an Initial Boot Block (IBB) to boot an Operating System (OS); and in response to determining that the first key is different from the second key, determining that the initial IE boot parameter stored in the IE FW is tampered with, and terminating a current boot;

wherein, before the terminating a current boot, the method further comprises:

querying a preset special boot rule to determine whether there is any allow boot command corresponding to the current IE boot parameter; and in response to determining that there is an allow boot command corresponding to the current IE boot parameter, controlling the BIOS through the IBB according to the current IE boot parameter to boot the OS, and simultaneously recording the current boot in a boot log as a special boot.

7. The electronic device according to claim 6, wherein before the controlling a BIOS through an IBB to boot an OS, the method further comprises:
verifying whether a current BIOS boot parameter is trusted;
in response to determining that the current BIOS boot parameter is untrusted, terminating the step of controlling a BIOS through an IBB to boot an OS; and
in response to determining that the current BIOS boot parameter is trusted, executing the step of controlling a BIOS through an IBB to boot an OS.

8. The electronic device according to claim 7, wherein the verifying whether a current BIOS boot parameter is trusted comprises:
extracting a third key from the IE FUSE, wherein the third key is generated based on an initial BIOS boot parameter stored in a BIOS boot parameter memory block, and the BIOS boot parameter memory block supports multiple data writes;
extracting a second signature from the BIOS boot parameter memory block, and generating a fourth key according to the second signature, wherein the fourth key is generated based on the current BIOS boot parameter stored in the BIOS boot parameter memory block;
determining whether the third key is the same as the fourth key;
in response to determining that the third key is the same as the fourth key, determining that the current BIOS boot parameter is trusted; and
in response to determining that the third key is different from the fourth key, determining that the current BIOS boot parameter is untrusted.

9. The electronic device according to claim 7, wherein when the current BIOS boot parameter is stored in two memory blocks of Key Manifest (KM) and Boot Policy Manifest (BPM) separately, the verifying whether a current BIOS boot parameter is trusted comprises:
extracting a fifth key from the IE FUSE, wherein the fifth key is generated based on an initial BIOS boot parameter stored in the KM, and the KM supports multiple data writes;
extracting a third signature from the KM, and generating a sixth key according to the third signature, wherein the sixth key is generated based on the current BIOS boot parameter stored in the KM;
determining whether the fifth key is the same as the sixth key;
in response to determining that the fifth key is the same as the sixth key, extracting a seventh key from the KM; extracting a fourth signature from the BPM, and generating an eighth key according to the fourth signature;
determining whether the seventh key is the same as the eighth key; in response to determining that the seventh key is the same as the eighth key, determining that the current BIOS boot parameter is trusted, wherein the seventh key is generated based on an initial BIOS boot parameter stored in the BPM, the BPM supports multiple data writes, and the eighth key is generated based on the current BIOS boot parameter stored in the BPM; and
in response to determining that the fifth key is different from the sixth key or the seventh key is different from the eighth key, determining that the current BIOS boot parameter is untrusted.

10. The electronic device according to claim 6, further comprising:
obtaining a boot count of special boots within preset time statistically according to the boot log; and
in response to the boot count exceeding a preset count, giving a replacement prompt through a preset path, so as to replace a current chip device with a new chip device according to the replacement prompt, wherein a new first key generated based on the current IE boot parameter is stored in an IE FUSE of the new chip device.

11. A non-transitory readable storage medium for storing a computer program, which when executed by a processor, causes the processor to implement a trusted boot method; wherein the trusted boot method comprises:
extracting a first key from an innovation engine (IE) (Filesystem in Userspace) FUSE, wherein the IE FUSE supports only one-time data write, the first key is generated based on an initial IE boot parameter stored in IE Firmware (FW), and the IE FW supports multiple data writes;
extracting a first signature from the IE FW, and generating a second key according to the first signature, wherein the second key is generated based on a current IE boot parameter stored in the IE FW;
determining whether the first key is the same as the second key;
in response to determining that the first key is the same as the second key, determining that the initial IE boot parameter stored in the IE FW is not tampered with, and controlling a Basic Input Output System (BIOS) through an Initial Boot Block (IBB) to boot an Operating System (OS); and
in response to determining that the first key is different from the second key, determining that the initial IE boot parameter stored in the IE FW is tampered with, and terminating a current boot;
wherein before the terminating a current boot, the method further comprises:
querying a preset special boot rule to determine whether there is any allow boot command corresponding to the current IE boot parameter; and
in response to determining that there is an allow boot command corresponding to the current IE boot parameter, controlling the BIOS through the IBB according to the current IE boot parameter to boot the OS, and simultaneously recording the current boot in a boot log as a special boot.

12. The non-transitory readable storage medium according to claim 11, wherein before the controlling a BIOS through an IBB to boot an OS, the method further comprises:
verifying whether a current BIOS boot parameter is trusted;
in response to determining that the current BIOS boot parameter is untrusted, terminating the step of controlling a BIOS through an IBB to boot an OS; and
in response to determining that the current BIOS boot parameter is trusted, executing the step of controlling a BIOS through an IBB to boot an OS.

13. The non-transitory readable storage medium according to claim 12, wherein the verifying whether a current BIOS boot parameter is trusted comprises:
extracting a third key from the IE FUSE, wherein the third key is generated based on an initial BIOS boot parameter stored in a BIOS boot parameter memory block, and the BIOS boot parameter memory block supports multiple data writes;

extracting a second signature from the BIOS boot parameter memory block, and generating a fourth key according to the second signature, wherein the fourth key is generated based on the current BIOS boot parameter stored in the BIOS boot parameter memory block;

determining whether the third key is the same as the fourth key;

in response to determining that the third key is the same as the fourth key, determining that the current BIOS boot parameter is trusted; and in response to determining that the third key is different from the fourth key, determining that the current BIOS boot parameter is untrusted.

14. The non-transitory readable storage medium according to claim 12, wherein when the current BIOS boot parameter is stored in two memory blocks of Key Manifest (KM) and Boot Policy Manifest (BPM) separately, the verifying whether a current BIOS boot parameter is trusted comprises:

extracting a fifth key from the IE FUSE, wherein the fifth key is generated based on an initial BIOS boot parameter stored in the KM, and the KM supports multiple data writes;

extracting a third signature from the KM, and generating a sixth key according to the third signature, wherein the sixth key is generated based on the current BIOS boot parameter stored in the KM;

determining whether the fifth key is the same as the sixth key;

in response to determining that the fifth key is the same as the sixth key, extracting a seventh key from the KM; extracting a fourth signature from the BPM, and generating an eighth key according to the fourth signature; determining whether the seventh key is the same as the eighth key; in response to determining that the seventh key is the same as the eighth key, determining that the current BIOS boot parameter is trusted, wherein the seventh key is generated based on an initial BIOS boot parameter stored in the BPM, the BPM supports multiple data writes, and the eighth key is generated based on the current BIOS boot parameter stored in the BPM; and in response to determining that the fifth key is different from the sixth key or the seventh key is different from the eighth key, determining that the current BIOS boot parameter is untrusted.

15. The non-transitory readable storage medium according to claim 11, further comprising:

obtaining a boot count of special boots within preset time statistically according to the boot log; and in response to the boot count exceeding a preset count, giving a replacement prompt through a preset path, so as to replace a current chip device with a new chip device according to the replacement prompt, wherein a new first key generated based on the current IE boot parameter is stored in an IE FUSE of the new chip device.

* * * * *